United States Patent
Cao et al.

(10) Patent No.: US 8,922,954 B2
(45) Date of Patent: Dec. 30, 2014

(54) DATA READER WITH BACK EDGE SURFACE

(71) Applicant: Seagate Technology LLC, Cupertino, CA (US)

(72) Inventors: Xin Cao, Londonderry (GB); Frances Paula McElhinney, Derry (GB); Jiansheng Xu, Derry (GB); Marcus Winston Ormston, Derry (GB)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/887,900

(22) Filed: May 6, 2013

(65) Prior Publication Data

US 2014/0327988 A1    Nov. 6, 2014

(51) Int. Cl.
*G11B 5/127* (2006.01)
*G11B 5/187* (2006.01)

(52) U.S. Cl.
CPC ............ *G11B 5/1871* (2013.01); *G11B 5/1272* (2013.01)
USPC ....................................... 360/324

(58) Field of Classification Search
CPC ........ G11B 5/127; G11B 5/39; G11B 5/3932; G11B 5/3906; G11B 5/33
USPC .......... 360/324, 324.1, 324.2, 324.11, 324.12
See application file for complete search history.

(56) References Cited

U.S. PATENT DOCUMENTS

| | | |
|---|---|---|
| 6,609,948 B1 | 8/2003 | Fontana, Jr. et al. |
| 7,422,511 B2 | 9/2008 | Fukuroi |
| 7,587,809 B2 | 9/2009 | Dimitrov et al. |
| 7,683,610 B2 | 3/2010 | Shimazawa |
| 8,291,743 B1 | 10/2012 | Shi et al. |
| 8,361,541 B2 | 1/2013 | Lee et al. |
| 8,375,565 B2 | 2/2013 | Hu et al. |
| 2011/0294398 A1 | 12/2011 | Hu et al. |

FOREIGN PATENT DOCUMENTS

WO    WO 2008126136 A1 * 10/2008

* cited by examiner

*Primary Examiner* — Allen T Cao
(74) *Attorney, Agent, or Firm* — Hall Estill Attorneys at Law

(57) ABSTRACT

A data reader can be configured with at least a magnetically responsive lamination that has a first portion with a first stripe height from an air bearing surface (ABS) and a second portion with a different second stripe height from the ABS. The first portion can be constructed to have a back edge surface shaped at a predetermined angle relative to the ABS by a back edge feature.

20 Claims, 4 Drawing Sheets

DATA READER WITH BACK EDGE SURFACE

SUMMARY

Various embodiments of the present disclosure are generally directed to a data reader that is capable of sensing data from a rotatable medium.

In accordance with some embodiments, a magnetically responsive lamination has a first portion with a first stripe height from an air bearing surface (ABS) and a second portion with a different second stripe height from the ABS. The first portion is constructed to have a back edge surface shaped at a predetermined angle relative to the ABS by a back edge feature.

DETAILED DESCRIPTION

The minimization of data sensing components such as transducing laminations and shields has pushed the physical limits of materials and conventional deposition processes. For data sensing laminations, reader width and shield-to-shield spacing has continued to decrease to keep up with increasing data storage density. However, due to volume reduction of magnetic layers of the sensing lamination, the reader magnetic stability is degraded. The use of differing stripe heights from an air bearing for various regions of a data sensing lamination can provide shape anisotropy that stabilizes magnetic operation of the lamination. However, fabrication of such varying stripe heights on a nanometer scale can be imprecise and lead to degraded data sensing performance. As such, there is a continued industry demand for data sensing laminations that can be reliably constructed on a nanometer scale according to design specifications.

Accordingly, a data reader may be configured with at least a magnetically responsive lamination that has a first portion with a first stripe height from an air bearing surface (ABS) and a second portion with a different second stripe height from the ABS, with the first portion having a back edge surface shaped at a predetermined angle relative to the ABS by a back edge feature. The shaping of the back edge surface with the back edge feature allows more fabrication processing time to precisely shape the back edge surface at the predetermined angle. Such a back edge feature can be selectively applied, and removed, prior to the magnetic sensing lamination being used in a data storage device, which can maintain reduced lamination width and shield-to-shield spacing.

Figure 1:
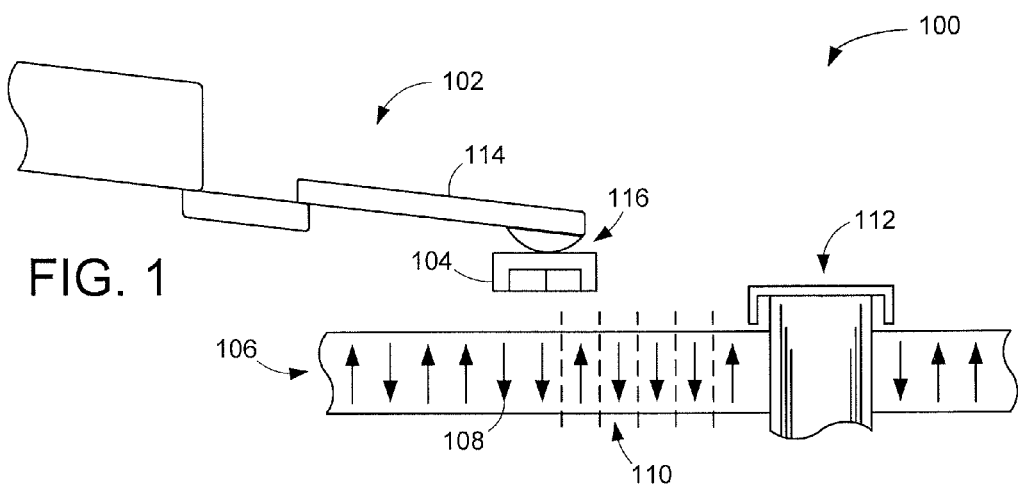
FIG. 1 is a block representation of an example portion of a data storage device.

FIG. 1 generally illustrates a top view block representation of an example data storage device 100 that can utilize a magnetically responsive lamination having a shaped back edge surface in accordance with various embodiments. The data storage device 100 is shown in a non-limiting configuration that has an actuating assembly 102 that positions a transducing head 104 over a magnetic storage medium 106 where one or more data bits 108 are stored on predetermined data tracks 110. The storage medium 106 can be attached to a spindle motor 112 that rotates during use to produce an air bearing surface (ABS) on which a slider portion 114 of the actuating assembly 102 flies to position a head gimbal assembly (HGA) 116, which includes the transducing head 104, over a predetermined portion of the medium 106.

The transducing head 104 can be configured with one or more transducing elements, such as a magnetic writer, magnetically responsive reader, and magnetic shields, which operate to program and read data from the selected data tracks 110 of the storage medium 106, respectively. In this way, controlled motion of the actuating assembly 102 causes the transducers to align with the data tracks 110 defined on the storage media surfaces to write, read, and rewrite data. As data bits 108 become more densely positioned in the data tracks 110, the capacity of the data medium 106 is increased, which can lead to increased transducer instability as stray magnetic fields are more prevalent.

Figure 2A:
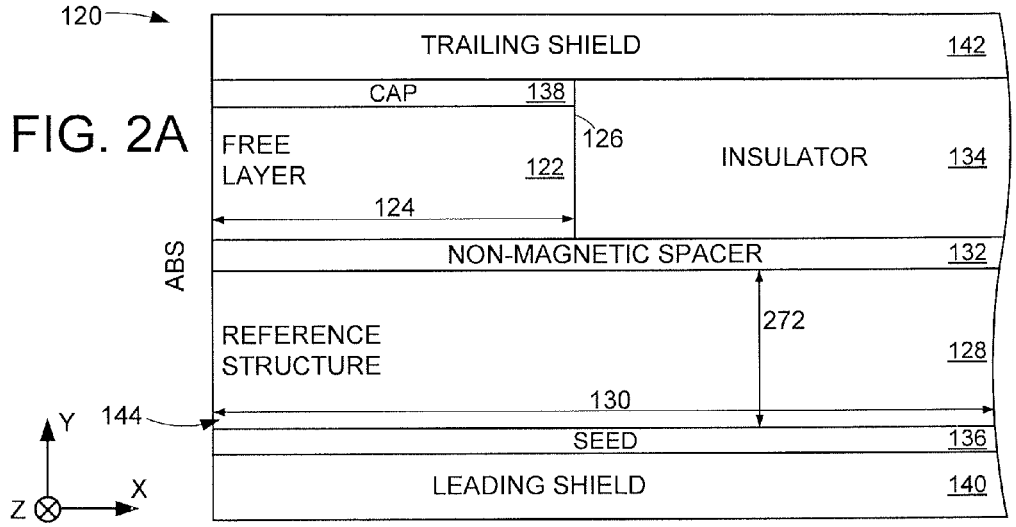
FIGS. 2A and 2B respectively provide front and cross-sectional block representations of portions of a transducing element capable of being used in the data storage device of FIG. 1.
Figure 2B:
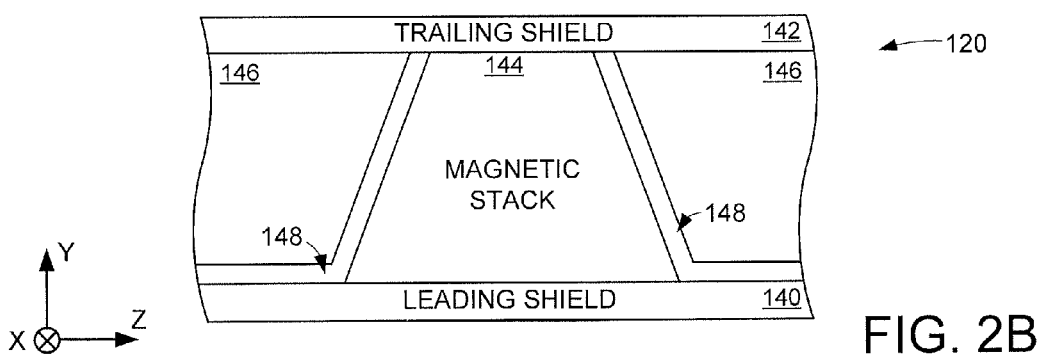

The effect of more stray magnetic fields and the thermal instability due to shrinking transducer size may be mitigated by utilizing shape anisotropy and tuned material selection, as generally illustrated by the respective cross-section and ABS block representation views of an example transducing element 120 in FIGS. 2A and 2B. As shown in FIG. 2A, the transducing element 120 has a free layer 122 with a first stripe height 124 that continuously extends orthogonal to the ABS from a back edge surface 126. A reference structure 128 has a second stripe height 130 that also continuously extends orthogonal to the ABS.

Configuring the second stripe height 130 to be greater than the free layer stripe height 124 allows shape anisotropy to stabilize the magnetizations of the reference structure 128. While the reference structure 128 is shown as a single continuous layer, such construction is not required as the reference structure 128 can be a variety of different magnetic laminations that provide a magnetoresistive (MR) effect with the free layer 122 across the non-magnetic spacer 132. For instance, the reference structure 128 may have a fixed magnetization that does not respond to encountered data bits and is constructed as a pinned ferromagnetic layer contacting an antiferromagnet or a synthetic antiferromagnet (SAF) pinned to a predetermined magnetization by an antiferromagnetic. Similarly, the non-magnetic spacer 132 can be tuned for material to provide different types of data sensors, such as spin valve, abutted junction, GMR, and TMR.

Regardless of the material construction of the non-magnetic spacer 132 and reference structure 128, the longer second stripe height 130 can utilize shape anisotropy to maintain the magnetization of the reference structure 128 despite the increased presence of stray magnetic fields. Also, the longer second stripe height 130 can increase the volume and thermal stability of the reference structure 128. Such tuned reference structure 128 shape anisotropy does not interfere with the sensitivity and accuracy of the free layer 122 as a non-magnetic insulator 134 continuously extends from the back edge surface 126 to the second stripe height 130 to reduce shunting and increase data signal amplitude.

The free layer 122, spacer 132, and reference structure 128 can be collectively disposed between seed 136 and cap 138 layers that may serve as electrodes and buffer the magnetizations of the free layer 122 and reference structure 128 from the leading 140 and trailing 142 shields, respectively. In various embodiments, the seed 136, reference structure 128, spacer 132, free layer 122, and cap 138 are collectively characterized as a magnetic stack 144, but such structure description may be used in other embodiments to describe only the free layer 122, spacer 132, and reference structure 128 that serve to produce an MR data signal.

The tuned stripe height configuration of FIG. 2A may serve to stabilize internal magnetizations while the leading 140 and trailing 142 shields mitigate uptrack and downtrack magnetic fields, but the increased stray magnetic field of high data bit density data storage media can necessitate additional shielding. FIG. 2B displays an ABS view of the magnetic stack 144 disposed between side shields 146 that can act together with the leading 140 and trailing 142 shields to define a predetermined magnetic extent for the magnetic stack 144. The magnetic stack 144 may further be protected from magnetic shunting and data signal amplitude loss with the inclusion of a non-magnetic insulator 148 between the side shields 146 and the magnetic stack 144.

With the collective shielding and tuned stripe heights, the transducing element 120 can provide optimized data sensing performance in a variety of data bit density data storage environments. However, construction of such tuned materials, sizes, and positions on a nanometer scale can suffer from processing techniques with tolerances designed for larger dimension transducing elements, such as data writers and micron scale data readers.

Figure 3A:
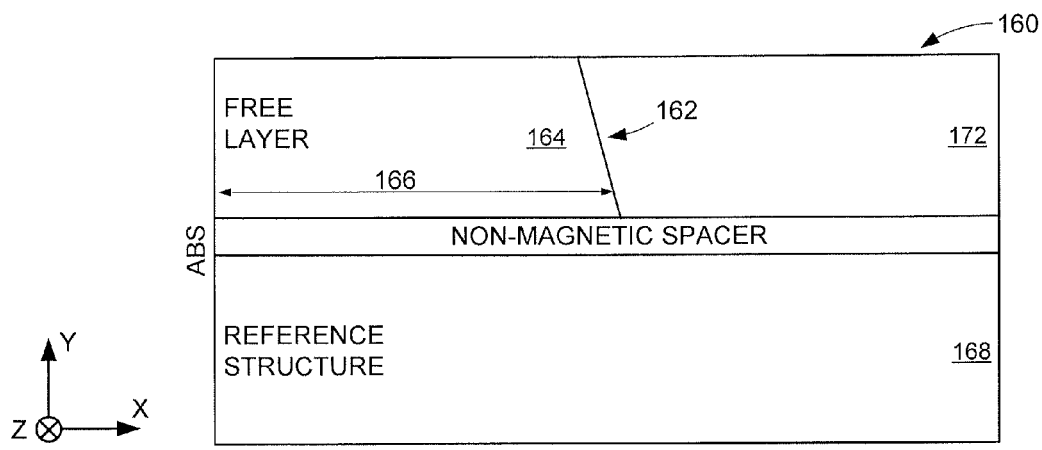
FIGS. 3A and 3B respectively show front and cross-sectional block representations of portions of a data reader constructed in accordance with various embodiments.
Figure 3B:
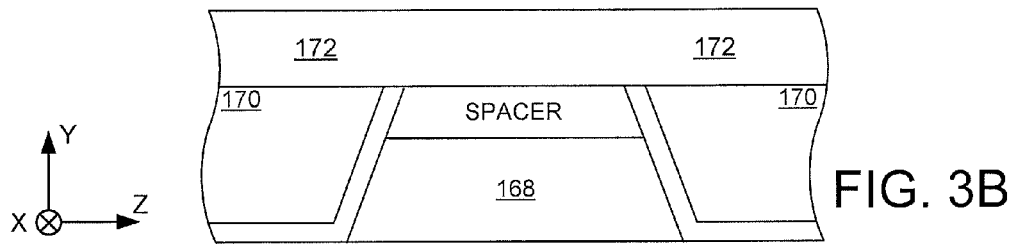

FIGS. 3A and 3B respectively display cross-section and ABS view block representations of an example nanometer scale data reader 160 constructed with processing techniques in accordance with some embodiments. When a magnetic stack and side shields are formed prior to shaping the back edge surface 162, processing features like an electronic lapping guide (ELG) are patterned at the same time as the back edge surface 162 is defined, which can lead to a poorly defined ELG feature. Additionally, the definition of the back edge surface 162 when the insulating gap material, such as 148 of FIG. 2B, and side shields are present can interfere with free layer material removal by inducing a shadowing effect during etching that will prevent complete removal of the free layer and definition of the back edge surface 162.

The processing time associated with defining the back edge surface 162 and ELG features can correspond with the thickness of the stack cap and free layers that are removed in at least one material removal operation, such as a milling or etching. The reduced material removal time available with relatively thin free 164 and cap layer thickness can produce a back edge surface 162 and ELG feature that is not well defined, which can limit magnetic stability and operation of the free layer 164.

The formation of the magnetic side shields prior to the definition of the back edge surface 162 may further result in residual side shield material 170 being present and degrading magnetic stability of the reader stack 160, as illustrated by the ABS view of FIG. 3B. Despite the residual side shield material 170 being partially or completely surrounded by insulating material 172, the presence of magnetic side shield material, like high coercivity and magnetic saturation materials, distal the ABS, may induce magnetic volatility and reduce reader 160 performance.

Figure 4:
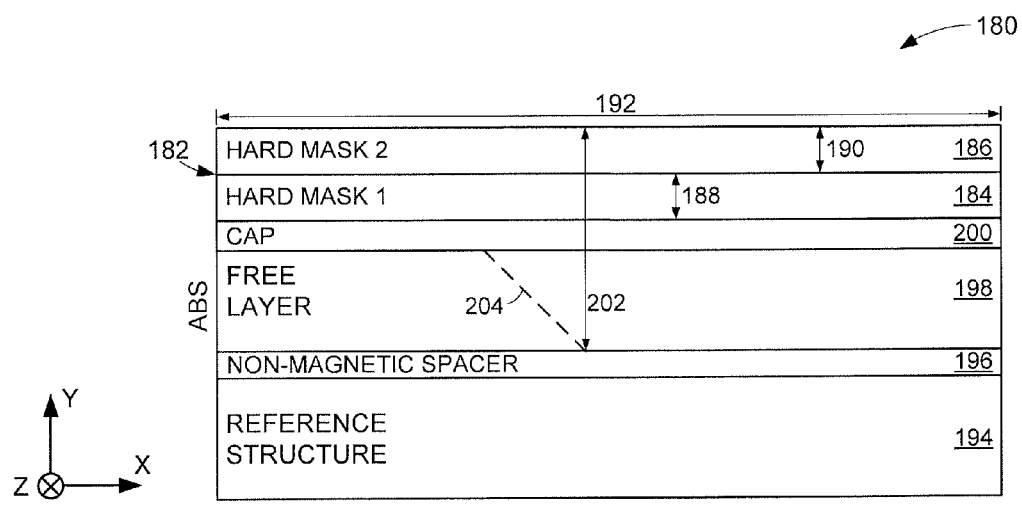
FIG. 4 displays a cross-sectional block representation of a portion of an example data reader configured in accordance with some embodiments.

With these definition process concerns in mind, a back edge feature can be used to increase the time available to define the back edge surface 164 and allow for formation of side shield material subsequent to magnetic stack construction to eliminate superfluous side shield material. FIG. 4 provides a general cross-section block representation of an example data reader 180 configured with a back edge feature 182 utilized prior to magnetic side shield deposition in accordance with some embodiments. While a back edge feature 182 can be configured in an unlimited variety of materials and number of layers, the embodiment shown in FIG. 4 has different first 184 and second 186 hard mask materials, such as amorphous carbon that can be a polish stop layer and non-magnetic metals like tantalum and ruthenium that can be a hard mask layer.

The constituent hard mask layers 184 and 186 can be respectively tuned with first 188 and second 190 thicknesses that continuously extend along the entire stripe height 192 of the reference structure 194, non-magnetic spacer 196, unprocessed free layer 198, and unprocessed cap 200. Such tuned thicknesses 188 and 190 provide a predetermined back edge thickness 202 along a plane positioned a predetermined distance from the ABS that corresponds with the post-processing stripe height of the free layer 196.

The increased back edge thickness 202 provided by the back edge feature 182 can allow the free layer 198 back edge surface and ELG feature to be uniform and well defined as the hard masks 184 and 186 allow more process margin for operations to remove reader material distal the ABS due at least in part to the lack of material, such as reader junction sidewall isolation material and side shields, to interfere with the material removal. Such tuned back edge thickness 202 and hard mask material selection can serve as a polish stop layer that ensures the top surface of the data reader 180 is sufficiently flat before reader sidewall and side shield formation.

The increased material removal time afforded by the back edge feature 182 can further allow for intricate shaping of the back edge surface of the free layer 198. Some embodiments shape the back edge surface to be parallel to the ABS along the Y axis while other embodiments position the back edge surface to a predetermined angle, such as 45° with respect to the ABS and Y axis, as shown by segmented line 204. The ability to increase the distance between the spacer 196 and the top surface of the back edge feature 182 is complemented by the tuned material selection of the hard mask layers 184 and 186 to provide a predetermined mill time that allows shaped back edge surface configurations to be established.

Figure 5:
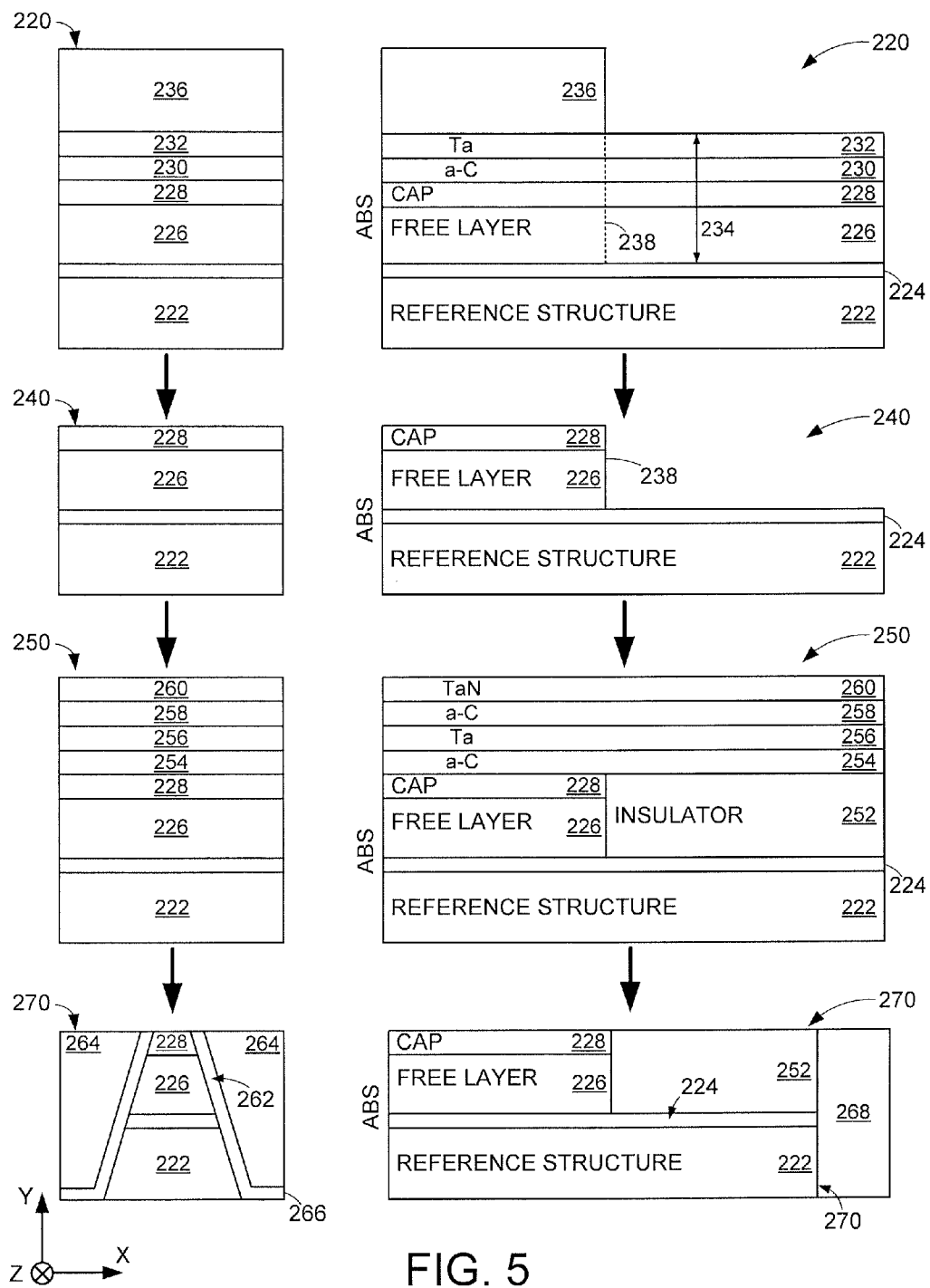
FIG. 5 provides a plurality of example data readers in various stages of a fabrication process conducted in accordance with various embodiments.

FIG. 5 displays an example process flow for the construction of an example data reader configured in accordance with various embodiments. As shown by cross-section and ABS views of an exemplary data reader 220, a data sensing stack of a reference structure 222, non-magnetic spacer layer 224, magnetically free layer 226, and electrode cap 228 are successively formed with predetermined materials, thicknesses, and stripe heights from the ABS along the X axis. The construction of the data sensing stack in some embodiments explicitly does not shape and process the sensing stack layers into a data reading junction, which can correspond with reader and side shield sidewall shaping. Such formation of the back edge layers 230 and 232 prior to reader sidewall and side shield formation can provide a back edge distance 234 that is greater than the free layer 226 and cap 228 aggregate thickness, as measured parallel to the ABS along the Y axis.

The placement of a pattern 236, such as a photoresist material, atop the back edge layers 230 and 232 can position the back edge surface stripe height from the ABS that can subsequently be defined through predetermined material removal of the back edge feature layers 230 and 232 as well as portions of the cap 228 and free 226 layers distal the ABS. The ELG feature can be defined by the same material removal step at the same time. In accordance with some embodiments, the back edge feature layers 230 and 232 are respectively configured as tantalum and a-C amorphous carbon that allow back edge surface 238 definition with increased precision.

The tuned material and thickness of the back edge feature layers 230 and 232 can be tuned to provide enough etch time for both reader back edge and the ELG feature to provide an optimized back edge surface 238 and optimized ELG feature patterning. Layers 230 and 232 also may be tuned to provide sufficient CMP stop at subsequent CMP stages while not inducing significant surface step once layers 230 and 232 are removed.

In summary, the increased back edge distance 234 and selection of back edge feature layers 230 and 232 materials that provide predetermined density, milling, and etching properties can allow more time during fabrication than if the back edge distance 234 included only the free 226 and cap 228 layers. Data reader 250 illustrates how the back edge surface 238 can be shaped to be substantially vertical with a uniform stripe height from the ABS after undergoing one or more material removal operations like knock-off milling.

The cross-section and ABS views of data reader 250 show the position of a back filled insulating layer 252, like alumina, that continuously extends from the back edge surface 238 to the stripe height of the reference structure 222 and spacer layer 224 while having a thickness that matches the aggregate of the free 226 and cap 228 layers. The back filling of the insulating layer 252 can provide a planar surface onto which a plurality of hard mask layers 254, 256, 258, and 260 are successively formed. The material and thickness of the respective hard mask layers can be similar or dissimilar, without limitation, to allow for the processing of the data reader sidewalls 262 and side shields 264, as displayed by data reader 270.

Data reader 270 further displays an example embodiment where the reference structure 222, spacer 224, free layer 226, and cap 228 are collectively shaped into a trapezoidal shape at an air bearing surface (ABS) with non-normal sidewall angular orientations that are matched by the side shield 264 sidewalls that are adjacent to, but separated from the reader sidewalls 262 by a non-magnetic gap layer 266. The shaping of the reader sidewalls 262 and formation of the side shields 264 independent of and subsequent to definition of the back edge surface 238 prevents residual shielding material from being positioned distal the ABS and detrimentally effecting back edge surface definition and operational magnetizations of the reference structure 222 and free layer 226. The shaping of the reader sidewalls 262 may, in various embodiments, correspond with definition of a reference structure 222 and spacer 224 stripe height with removal and subsequent backfilling of non-magnetic material past a plane 270 spaced a predetermined distance from the ABS.

Figure 6:
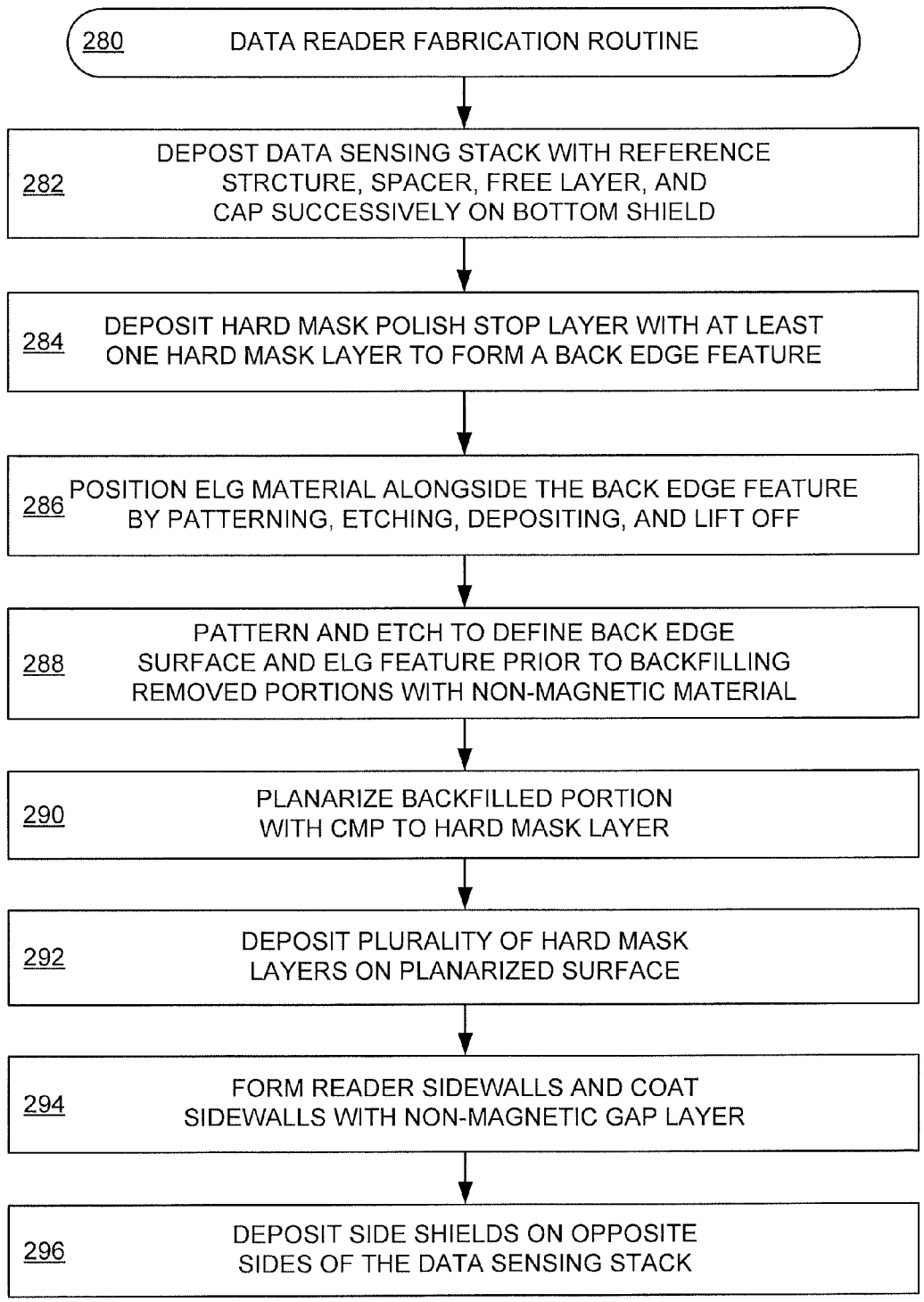
FIG. 6 provides a flowchart of a data reader fabrication routine conducted in accordance with some embodiments.

As can be appreciated from the example process flow of FIG. 5, various structural parameters, like stripe heights, back edge feature material, and back edge surface shape, can be tuned by controlling how the data reader is manufactured. FIG. 6 provides an example data reader fabrication routine 280 that is conducted in accordance with various embodiments to manufacture a nanometer scale data sensing element with precise structural features. The routine 280 may begin in a variety of non-limiting manners such as step 282 where a data sensing stack that has at least a reference structure, space, free layer, and cap are successively deposited on a bottom shield.

As previously discussed, the reference structure may be any number of fixed magnetization laminations like a pinned ferromagnetic layer or a pinned SAF that allow magnetoresistive sensing of external data bits along with the ferromagnetic free layer. In contrast to forming the reader sidewalls and the reader junction prior to formation of the different stripe heights for the free layer and reference structure, step 282 proceeds to step 284 without forming the reader junction by shaping the reader sidewalls or depositing any side shields. Such unprocessed data sensing stack can then have a back edge feature formed in step 284 with at least one hard mask polish stop layer, like amorphous carbon, and at least one hard mask layer, like tantalum, deposited with a predetermined thickness to provide a predetermined back edge distance and material removal time, as illustrated in FIGS. 4 and 5.

The formation of the back edge feature in step 284 can correspond with providing a particular material removal time, such as from etching, lapping, and milling. Step 286 proceeds to position an ELG material alongside the back edge feature via patterning the shape of the ELG material, etching material outside the pattern, depositing ELG material, and lifting off the pattern. With the ELG material in place, step 288 next defines the back edge surface with a photo resist pattern and associated material removal etch that also defines the ELG feature before non-magnetic material is backfilled into the previously removed regions of the read sensor.

Various embodiments use step 288 to shape the back edge surface with non-normal angular configurations, such as 45° relative to the ABS and continuously curvilinear, that may increase free layer magnetic stability and performance. Next, step 290 planarizes the backfilled material down to the hard mask layer from step 288 with a chemical mechanical polish and lift off process before step 292 deposits a plurality of hard mask layers, such as TaN and amorphous carbon, onto the planarized surface, as shown in FIG. 5. The number, material, and thickness of the various hard mask layers can be chosen to allow efficient formation of the reader sidewalls and reference structure stripe height in step 294. That is, the hard mask layers can provide a predetermined density and material removal rate that allows processing techniques, like milling, to create precise features on a nanometer scale.

One such precise feature may be angled sensing stack sidewalls that form a trapezoidal stack shape in step 294. The angled sidewalls may be further coated with a continuous non-magnetic gap layer that is also shaped in step 294 to have sidewalls angled at an orientation that matches the reader sidewalls. Regardless of the shape of the reader and non-magnetic gap layer sidewalls, step 296 proceeds to deposit side shields on opposite sides of the data sensing stack. The magnetic side shields can continuously extend only to a predetermined stripe height that is defined by the second stripe height to define the back edge surface prior to the definition of the sensing stack sidewalls and side shields in step 296.

Through the tuned deposition of the various magnetic sensing layers, shields, and processing layers, routine 280 can provide optimized back edge surface definition despite nanometer scale thicknesses for the free and cap layers. However, the routine 280 is not limited as the various steps shown in FIG. 6 as any portion can be omitted, changed, and added, without limitation. For instance, the routine 280 can use knock off milling and CMP processes to remove unwanted material from the top of the reader stack post side shield deposition. Furthermore, the routine 280 can further remove portions of the reference structure to define second back edge surface that is farther from the ABS than the free layer back edge surface.

The ability to increase magnetic performance afforded by having different stripe heights for the free layer and side shield is enabled by defining the free layer back edge surface before the reader sidewall and side shield. The back edge process flow of forming the back edge prior to the air bearing portion of the reader can allow the complete coverage of the side shield material along the reference structure while completely removing the side shield tail. The tuned material and thickness of the back edge feature can provide a greater back edge distance that corresponds with increased processing time and a more accurately defined back edge surface and ELG feature. Such tuned back edge feature material may further act as a polish stop layer to ensure the wafer flatness prior to reader sidewall and side shield formation. As such, a data reader can be optimized by increasing the processing margin for defining the back edge surface of the free layer.

What is claimed is:

1. An apparatus comprising a magnetically responsive lamination having a first portion with a first stripe height from an air bearing surface (ABS) and a second portion with a different second stripe height from the ABS, the first portion having a back edge surface shaped at a predetermined angle relative to the ABS by a back edge feature, the back edge feature comprising a plurality of hard mask layers.

2. The apparatus of claim 1, wherein the first portion comprises a ferromagnetic magnetically free layer and electrode cap.

3. The apparatus of claim 2, wherein the second portion comprises a pinned magnetization reference structure.

4. The apparatus of claim 3, wherein the pinned magnetization reference structure comprises a synthetic antiferromagnet.

5. The apparatus of claim 1, wherein the back edge feature comprises first and second hard mask layers each continuously extending from the ABS with the second stripe height.

6. The apparatus of claim 5, wherein the first hard mask layer contacting the first portion and the second hard mask layer separated from the first portion.

7. The apparatus of claim 5, wherein the hard mask layer comprises tantalum and the second hard mask layer comprises amorphous carbon.

8. The apparatus of claim 5, wherein the first and second hard mask layers have different thicknesses as measured parallel to an air bearing surface.

9. The apparatus of claim 5, wherein the first and second hard mask layers have a common thickness as measured parallel to an air bearing surface.

10. The apparatus of claim 1, wherein an electronic lapping guide is positioned alongside the back edge feature and the side shield continuously extends to the second stripe height.

11. The apparatus of claim 1, wherein the predetermined angle is parallel to an air bearing surface.

12. The apparatus of claim 1, wherein the predetermined angle is 45° relative to an air bearing surface.

13. A method comprising:
providing a magnetically responsive lamination having a first portion with a first stripe height from an air bearing surface (ABS) and a second portion with a different second stripe height from the ABS;
depositing a plurality of hard mask layers each continuously extending from the ABS with the second stripe height to form a back edge feature; and
shaping a back edge surface of the first portion at a predetermined angle relative to the ABS by the back edge feature.

14. The method of claim 13, wherein the back edge feature corresponds with a predetermined material removal time and back edge surface distance that are each greater than material removal of the first portion alone.

15. The method of claim 14, wherein the first stripe height is formed before a side shield is deposited and the second stripe height is formed subsequent to the side shield is deposited.

16. The method of claim 13, wherein a plurality of secondary hard mask layers are deposited atop the first portion after the back edge feature is removed and the first portion is polished.

17. The data reader of claim 13, wherein the shaping step occurs before a side shield is deposited.

18. The data reader of claim 13, wherein the shaping step occurs before the magnetically responsive lamination is configured into a trapezoidal shape.

19. A method comprising:
providing a magnetically responsive lamination having a first portion with a first stripe height from an air bearing surface (ABS) and a second portion with a different second stripe height from the ABS;
depositing a plurality of hard mask layers each continuously extending from the ABS with the second stripe height to form a back edge feature;
shaping a first back edge surface of the first portion at a predetermined angle relative to the ABS by a back edge feature; and
forming a second back edge surface of the second portion.

20. The method of claim 19, wherein the first back edge surface extends up to a non-magnetic spacer layer disposed between the first and second portions and the second back edge surface extends from the second portion through the non-magnetic spacer.

* * * * *